Aug. 19, 1952  E. L. McFERREN  2,607,234
CONTROL MECHANISM FOR MACHINE TOOLS
Original Filed Sept. 16, 1947  3 Sheets-Sheet 1
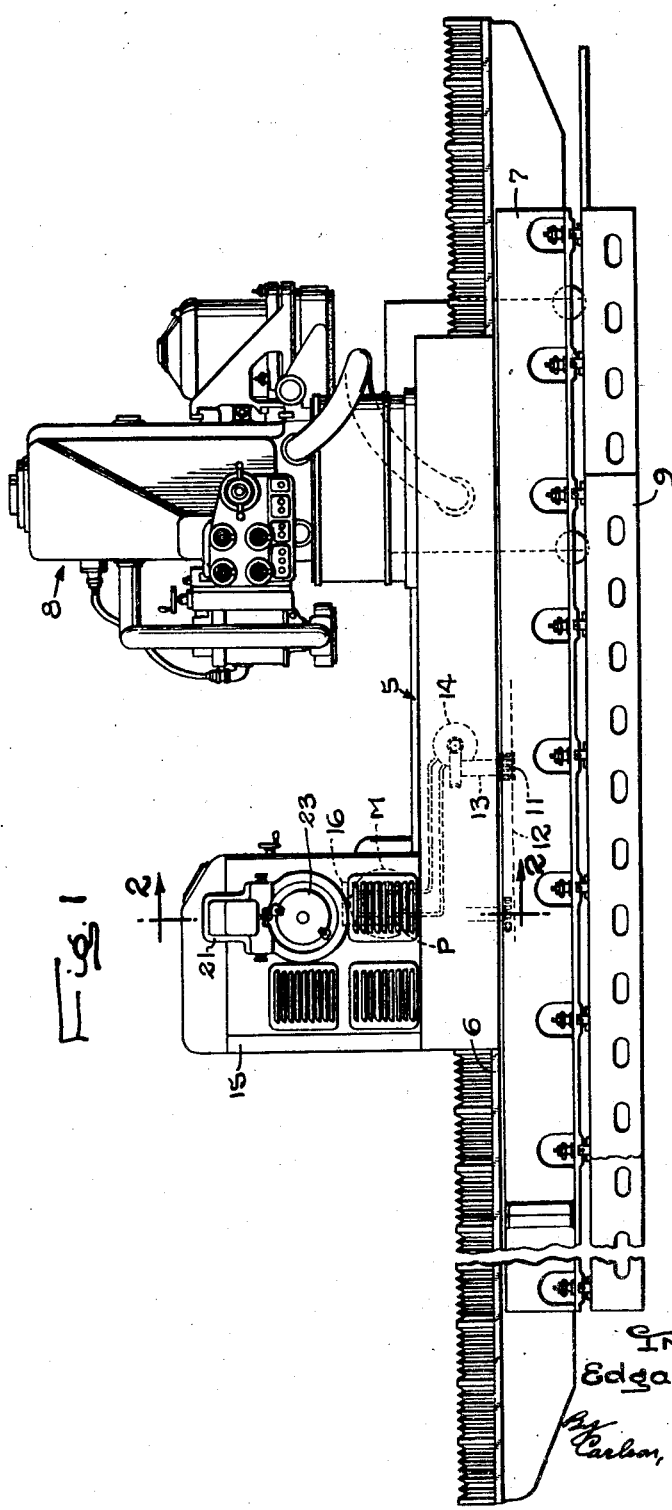
INVENTOR
Edgar Lee McFerren
ATTORNEYS

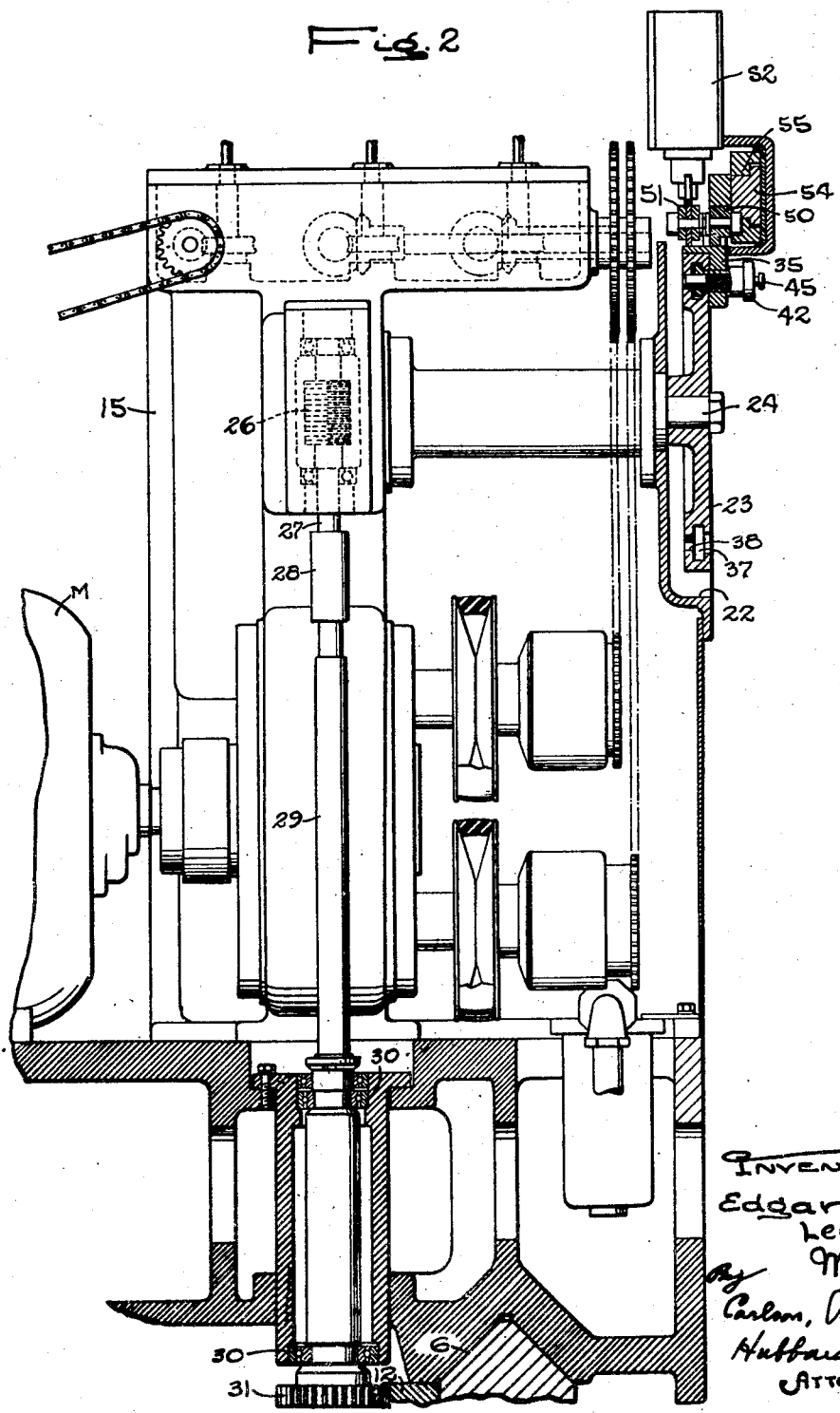

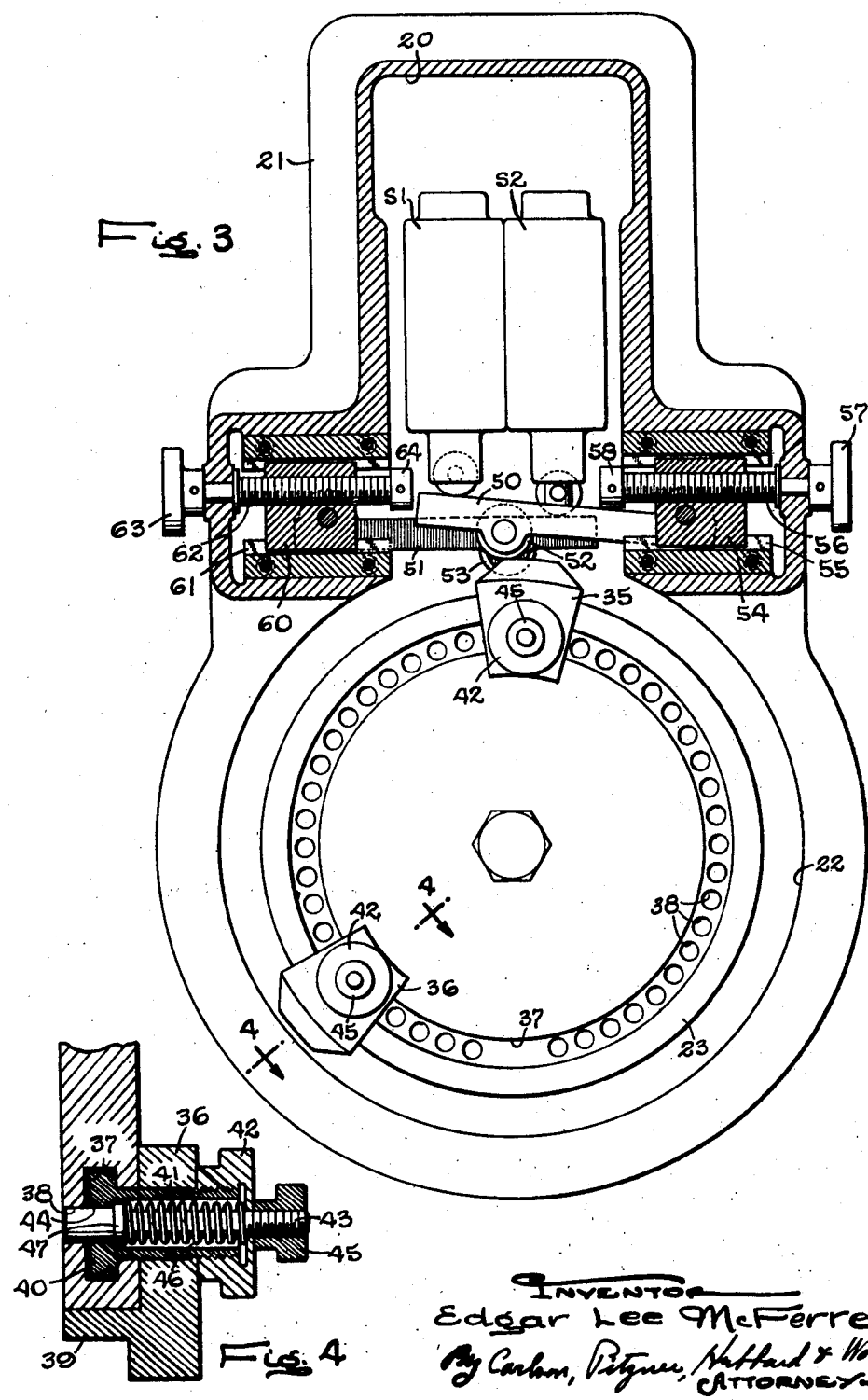

Patented Aug. 19, 1952

2,607,234

UNITED STATES PATENT OFFICE 2,607,234

CONTROL MECHANISM FOR MACHINE TOOLS

Edgar Lee McFerren, Fond du Lac, Wis., assignor to Giddings & Lewis Machine Tool Company, Fond du Lac, Wis., a corporation of Wisconsin Original application September 16, 1947, Serial No. 774,366. Divided and this application April 11, 1949, Serial No. 86,837

3 Claims. (Cl. 74—53)

The invention relates to machine tools generally, and is more particularly concerned with improved mechanism for controlling the operating cycle of a reciprocating element of such machines.

The present application is a division of my copending application Serial No. 774,366, filed September 16, 1947, now Patent No. 2,561,936.

One object of the invention is to provide an improved control mechanism for reciprocatory machine tool elements which is simple in construction and which is susceptible of quick and very accurate adjustments.

Another object is to provide control mechanism of the above general character, wherein the controlling elements which determine the limits of travel of the reciprocatory machine part are grouped together in a compact assembly so that adjustments affecting reciprocation may be made quickly and conveniently at a single control station irrespective of the range of travel of the part.

Other objects and advantages of the invention will become apparent from the following detailed description of the preferred embodiment illustrated in the accompanying drawings, in which:

Figure 1 is a front elevational view of a machine tool embodying the features of the invention.

Fig. 2 is a transverse sectional view of the machine taken in a vertical plane substantially on the line 2—2 of Fig. 1.

Fig. 3 is a partly sectioned front elevational view of the control mechanism.

Fig. 4 is a enlarged sectional view taken in a plane substantially on the line 4—4 of Fig. 3, showing details of the dog clamp.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

By way of illustration, the invention has been shown as incorporated in a machine tool having a reciprocatory part in the form of a carriage or saddle 5 supported and guided by horizontal ways 6 on the upper face of an elongated bed 7. The particular machine illustrated is of the type known as a way grinding machine and the reciprocation of the saddle 5 is utilized to traverse a grinding tool head 8 relative to a workpiece supported on a table 9 arranged at one side of the base. It will be understood, of course, that the specific tooling of the machine is immaterial to the present invention, which is concerned only with the control of the reciprocating movements of the saddle 5.

Power-actuated means of any suitable character may be utilized for driving the saddle 5 in reciprocation. The exemplary machine is equipped with driving mechanism of the type disclosed and claimed in the Gallimore application Serial No. 547,481, filed July 31, 1944, now Patent No. 2,483,535. In general, this mechanism includes a pinion 11 (Fig. 1) cooperating with a rack 12 (Fig. 2) rigid with and extending longitudinally of the machine bed 7. The pinion 11 is carried by a vertically disposed shaft 13 (Fig. 1) journaled on the saddle 5 and driven through suitable gearing by reversible rotary fluid motor 14.

Pressure fluid is supplied to the motor 14 by the pump P driven by an electric motor M (Fig. 2) enclosed within an upright housing 15 on the saddle 5. The pump P has the usual control which is shiftable by a power-actuated controller 16 through a central or neutral position defining zero displacement into opposite limit positions defining, respectively, preset displacement of fluid in opposite directions of delivery. The connections between the pump P and motor 14 are such that when the controller is set in one limit position the motor is operated in a direction to traverse the saddle 5 to the right, as viewed in Fig. 1. Shifting of the controller to the neutral position stops the motor and saddle, and further shifting of the controller to the other limit position reverses the motor and traverses the saddle in the opposite direction or to the left.

The present invention provides means of a novel and advantageous character for controlling the operation of the controller 16 to determine the direction of travel of the saddle 5 automatically in response to the reciprocation of the saddle. This control is effected by alternate actuation of a pair of control devices in timed relation to the reciprocation of the saddle. Where the controller 16 is electrically operated or includes electrical operating or control elements, the control devices conveniently comprise switches and have been shown herein that form as switches S–1 and S–2 (Fig. 3).

In the exemplary machine, the switches S–1 and S–2 are mounted in a chamber 20 formed within a casing 21 mounted on the front wall of the housing 15. The chamber 20 opens at its lower end into a circular chamber 22 which houses a rotatably supported disk-shaped control member 23 operative to actuate the switches S-1 and S-2 as an incident to its oscillation. As shown in Fig. 2, the control member 23 is fixed on the outer end of a horizontally disposed shaft 24 journaled on the framework of the housing 15. This shaft is provided at its inner end with a worm wheel (not shown) coacting with a worm 26 fixed on the upper end of a vertically disposed shaft 27. The latter is connected by a coupling 28 with a vertical shaft 29 journaled in antifriction bearings 30 carried by the saddle 5 and is provided at its lower end with a pinion 31 meshing with the rack 12 on the machine bed 7. The arrangement is such that the control member 23 is rocked alternately in opposite directions incident to the reciprocation of the saddle and through an angle accurately proportioned to the range of movement of the saddle.

Mounted on the control member 23 is a pair of switch actuating dogs 35 and 36. The dogs are adjustably secured to the disk so that they may be variably positioned circumferentially thereof, whereby to actuate the switches S-1 and S-2 in selected positions of the saddle. As shown in Fig. 4, the control member 23 has in its marginal edge portion an annular T-slot 37 opening in the front face of the control member. In the bottom of the slot are a series of pilot holes 38.

The dogs 35 and 36 are generally alike in construction, each having a generally wedge-shaped body with an inwardly directed flange 39 (Fig. 4) adapted to engage the periphery of the control member 23 and thus locate the body of the dog over the T-slot 37. The dog is releasably clamped to the member by a clamping bolt having a head portion 40 engaging in the T-slot 37 and a tubular shank portion 41 projecting from the slot through an aperture in the body of the dog. A nut 42 threaded on the projecting end of of the shank 41 and bearing against the front face of the dog is operable to draw the head of the bolt into clamping engagement with the walls of the T-slot and thus frictionally clamp the dog in adjusted position on the control member 23. When the position of the dog is to be changed, the nut 42 is backed off sufficiently to release the clamping bolt, which may then be shifted along the T-slot to the new position.

To facilitate positioning of the dogs 35 and 36, and to assist in maintaining them in adjusted positions on the control member, each of the bolts 41 is provided with an elongated pilot pin 43 extending through its tubular shank and through an aperture 44 in the head 37 of the bolt. The other end of the pin is extended through an aperture in the nut 42 and is threaded for the reception of an operating knob 45.

A coiled compression spring 46 interposed between the inner face of the nut 42 and a circumferential flange 47 on the pin 43 yieldably urges the pin inwardly so as to project its inner end or end portion into the pilot hole 38 over which the dog is located. The pilot pin thus cooperates with the pilot hole to locate the dog on the control member 23 and to insure against movement of the dog in case the clamping means is inadvertently released. In adjusting the position of the dog the pin is withdrawn from the pilot hole against the action of the spring 46 by means of the knob 45.

In accordance with the invention, switch actuation is accurately coordinated with the saddle position by an arrangement whereby the dogs 35 and 36 perform their switch actuating functions indirectly through the agency of adjustable switch actuators, herein shown as levers 50 and 51. Each of the levers is pivotally supported at one end and has its free end positioned to engage the movable member of one of the switches S-1 and S-2. As herein shown, the levers are arranged in side-by-side relation at one edge of the control member 23 and are provided with follower rollers 52 and 53 engageable respectively by cam surfaces formed on the dogs 35 and 36, the cam surfaces being offset laterally to aline with the levers 50 and 51. Thus, as the dog 35 is rocked into engagement with the follower roller 52, the lever 50 is rocked upwardly to actuate the switch S-1. Similarly, as the dog 36 engages the follower roller 53, the lever 51 is swung upwardly to actuate the switch S-2.

In order to determine and to regulate the precise point at which either dog is effective to rock its associated lever to switch actuating position, the levers are arranged for adjustment substantially tangentially of the control member 23. For this purpose the lever 50 is pivoted on a slide 54 supported in a guideway 55 in the casing 21 at one side of the chamber 20. Shifting of the slide along the guideway is effected by means of an adjusting screw 56 threaded into the slide and rotatably anchored in the side wall of the housing 21. A knob 57 is provided on the projecting end of the screw for manual rotation of the same. A stop collar 58 pinned or otherwise fixed on the inner end of the screw limits inward movement of the slide.

The lever 51 is similarly pivoted on a slide 60 supported in a guideway 61 in the housing 21 at the side of the chamber 20 opposite that in which the slide 54 is located. Adjustment of the slide 60 is effected by a screw 62 threaded through the slide and having a finger nob 63 at its outer end and a stop collar 64 at its inner end.

It will be evident that adjustments of the slides 54 and 60 will shift the pivotal axes of the lever 51 and will also change the point at which their respective follower rollers 52 and 53 are engaged by the dogs 35 and 36 in the oscillation of the control member 23. Accurate determination of the precise point at which switch actuation and thus reversal of saddle movement occurs is therefore readily attained. It will be understood, of course, that rough adjustment of the points of saddle reversal is effected by locating the dogs 35 and 36 on the control member 23 by means of the pilot holes and cooperating pilot pins 43. In practice, the pilot holes may be spaced apart to correspond to a predetermined range of movement of the saddle, as, for example, a movement of six inches. Accurate adjustment of the reversal point within this range is then effected by adjustment of the slides 54 and 60 and their associated switch actuating levers 50 and 51. Such adjustments may be made very quickly and easily, and remain unchanged while the machine is in operation.

I claim as my invention:

1. For a machine having a working element mounted thereon for movement in opposite directions and having driving means for actuating said element, a control mechanism adapted to be associated with the machine for controlling the driving means to cause the movement of the element to be reversed when the element has through movement in one direction reached a preselected position, said mechanism including a rotatable control member adapted to have angular rotation proportional to the movement of the working element in directions corresponding to the directions of movement of the element, a dog adjustably positioned on said member, guide means disposed alongside the path of movement of said dog, a slide mounted in guided relation with said guide means, a lever pivotally attached to said slide, a reversing control device adapted for association with said driving means and having a controlling part thereof operatively associated with said lever to be actuated thereby, said lever being located in position to be engaged by said dog and rocked by said dog about its pivotal attachment to said slide to actuate said control device, adjustment of said dog on said control member serving to effect a coarse adjustment in the position of said control member at which said control device is actuated through said dog and lever, and screw thread adjusting means operatively connected with said slide for accurately adjusting the position of said slide relative to said guide means, said adjustment in the position of said slide accurately determining the point of movement of said control member at which said dog will engage said lever, said screw thread adjusting means thus serving to effect fine adjustments in the position of said control member at which said control device will be actuated.

2. Mechanism for controlling the reverse movements of a machine tool element comprising, in combination, a rotatable control member adapted to be rotated alternately in opposite directions in response to reverse movements of the element, two dogs mounted on said member in angularly spaced relation to each other, two sets of guiding means defining elongated guiding surfaces disposed in generally tangential relation to the paths of movement of said respective dogs, two slides mounted in guided relation with said respective guiding surfaces, two levers pivotally attached to said respective slides, each of said levers having associated therewith a reversing control device arranged to be actuated by pivotal movement of the lever and adapted to reverse the movement of the machine tool element, one of said levers being located in position to be engaged by one of said dogs upon rotation of said control member into a first predetermined angular position, the other of said levers being located in position to be engaged by the other of said dogs upon rotation of said control member into a second predetermined angular position, each dog being effective to rock its respective lever about the pivotal attachment of the lever to the slide of that lever to actuate the associated reversing control device, adjusting means associated with each of said dogs to adjust the angular position of the dogs relative to said control member to effect coarse adjustments in said first and second angular positions of said control member at which said respective dogs engage their coacting levers, first screw thread adjusting means operatively connected with one of said slides to accurately adjust the position of the slide along its guide means, and second screw thread adjusting means independent of said first screw thread adjusting means and operatively connected with the other of said slides, said second screw thread adjusting means being operable to accurately adjust the position of said other slide in its guide means independently of the position of said first slide, said screw thread adjusting means thereby being operable to effect fine adjustments in said first and second angular positions which said control member must reach to engage said respective dogs with their respective levers.

3. For a machine having a working element mounted thereon for movement in opposite directions and having driving means for actuating said element; an adjustable control mechanism adapted to be associated with the machine for controlling the driving means to cause the movement of the machine element to be terminated when the latter has, through movement in one direction, reached a preselected position; said mechanism comprising, in combination, a control member, mounting means supporting said member for movement along a predetermined path, said control member being adapted for interconnection with the machine element to have movement proportional to the movement of the latter and in directions corresponding to the directions of movement of the element, an engaging member adjustably mounted on said control member to have various fixed positions thereon, means on said engaging member defining a cam surface disposed in inclined relation to the contiguous segment of the path of movement of the engaging member as determined by said control member path of movement, guide means disposed alongside said engaging member path of movement in generally tangential relation to at least one segment thereof, a slide mounted in guided relation to said guide means, a control lever pivotally attached to said slide and having a cam follower thereon disposed in position to be engaged by said cam surface whereby said lever is rocked about its pivotal attachment to said slide by said engaging member, a control device adapted for association with said driving means and having a controlling part positioned to be actuated by said lever upon said rocking movement thereof, adjustment of said engaging member on said control member serving to effect coarse adjustments in the position of the latter at which said control device is actuated through said engaging member and lever, and fine adjusting means operatively connected to said slide for accurately adjusting the longitudinal position thereof relative to said guide means, said adjustment in the longitudinal position of said slide accurately determining the point of movement of said control member at which said engaging member will contact said cam follower and thereby serving to effect fine adjustments in the position of said control member at which said control device will be actuated.

EDGAR LEE McFERREN.

REFERENCES CITED

The following references are of record in the file of this patent:

UNITED STATES PATENTS

| Number | Name | Date |
|---|---|---|
| 1,459,756 | Stahl | June 26, 1923 |
| 1,787,292 | Townsend | Dec. 30, 1930 |
| 2,119,567 | Williams | June 7, 1938 |
| 2,147,989 | Puurmann | Feb. 21, 1939 |
| 2,170,697 | Richter | Aug. 22, 1939 |
| 2,358,759 | Maude | Sept. 19, 1944 |